UNITED STATES PATENT OFFICE.

LEWIS FRANCIS AND CYRUS H. LOUTREL, OF NEW YORK, N. Y., ASSIGNEES OF LEWIS FRANCIS, OF SAME PLACE.

IMPROVED COMPOSITION OF MATTER.

Specification forming part of Letters Patent No. 41,887, dated March 8, 1864; Reissue No. 1,771, dated September 27, 1864; Reissue No. 1,885, dated February 28, 1865.

*To all whom it may concern:*

Be it known that LEWIS FRANCIS, of New York, in the county and State of New York, has invented, made, and applied to use a new and useful Composition of Matter; and we do declare the following to be a full, clear, and correct description of the same.

The nature of the invention consists in combining an alkali, or alkalies, or alkaline earths, or any of their compounds, to form a new and useful composition of matter for various purposes.

To enable those skilled in the arts to make and use the invention, we will describe the manner in which we manufacture the improved composition.

In making the improved composition the ingredients are employed in about the following proportions: glue, fifteen (15) pounds; glycerine, thirty-two (32) pounds; borax, eight (8) ounces; ammonia, four (4) ounces. The glue is first soaked in water for about five minutes, in order that it, (the glue,) when added to the glycerine, may be thoroughly incorporated with it. In many cases I prefer dissolving a certain quantity of lime in the water in which the glue is to be soaked prior to soaking the glue therein. The glycerine is placed in a steam-kettle and heated to a temperature of about 200° Fahrenheit, and the glue and glycerine and alkali or alkalies employed are united by gradually adding the glue and alkali or alkalies to the glycerine, the latter being kept well stirred until all the ingredients have been added and thoroughly incorporated with the glycerine. The composition thus formed may be cast into sheets or cakes of any desired form, ready as an article of commerce. The sheets or cakes are exposed to the air several days, in order that any water remaining in the composition may be thoroughly evaporated; or a vacuum-pan may be used for this purpose. By this last process all liability of the composition to shrink from the presence of water or moisture is obviated. The composition is then ready for sale, or for remelting and casting into any desired form, and can be recast from time to time.

The improved composition thus made will be found particularly applicable to the manufacture of a superior article of printers' inking-rollers, to the lining of barrels or vessels for petroleum, fluids, and semi-fluids, as well as dry substances, for various purposes where elasticity is required, for the taking of impressions in various ways, for the formation of molds and casts, and various other purposes.

We do not wish to be understood as intending to confine ourselves to the use of the ingredients specified in the proportions specified, as we are fully aware that those proportions may be in some cases advantageously varied. Neither do we intend to confine ourselves to the use of glue in the making of the composition, as other gelatines may be substituted for glue, and various gums, resins, and bitumen may be employed in part, and the composition thereby improved for some purposes, care being taken that when any one of the gums, resins, or bitumen is employed the same is first dissolved by its proper solvent before being added in the manufacture of the composition.

Having thus described the invention, what we claim as new, and desire to secure by Letters Patent, is—

Combining an alkali or alkalies or alkaline earths or any of their compounds with glue and glycerine, to form a new and useful composition of matter for various purposes.

LEWIS FRANCIS.
CYRUS H. LOUTREL.

In presence of—
A. SIDNEY DOANE,
W. D. EVERIT.